United States Patent
Ito et al.

(10) Patent No.: US 11,956,636 B2
(45) Date of Patent: *Apr. 9, 2024

(54) COMMUNICATION TERMINAL, NETWORK DEVICE, COMMUNICATION METHOD, AND NON-TRANSITORY COMPUTER READABLE MEDIUM

(71) Applicant: NEC Corporation, Tokyo (JP)

(72) Inventors: Hironori Ito, Tokyo (JP); Anand Raghawa Prasad, Tokyo (JP); Andreas Kunz, Heidelberg (DE); Sivabalan Arumugam, Tamil Nadu (IN); Sivakamy Lakshminarayanan, Tamil Nadu (IN); Sheeba Backia Mary Baskaran, Tamil Nadu (IN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,184

(22) Filed: Dec. 13, 2022

(65) Prior Publication Data
US 2023/0104549 A1  Apr. 6, 2023

Related U.S. Application Data

(63) Continuation of application No. 17/201,280, filed on Mar. 15, 2021, now Pat. No. 11,553,345, which is a
(Continued)

(30) Foreign Application Priority Data

Mar. 17, 2017  (IN) .............................. 201711009358

(51) Int. Cl.
*H04W 12/106*  (2021.01)
*H04W 12/037*  (2021.01)
(Continued)

(52) U.S. Cl.
CPC ....... *H04W 12/106* (2021.01); *H04W 12/037* (2021.01); *H04W 12/041* (2021.01);
(Continued)

(58) Field of Classification Search
CPC ............. H04W 12/106; H04W 12/037; H04W 12/041; H04W 12/08; H04W 36/14; H04W 36/16; H04W 36/0066; H04W 48/18
See application file for complete search history.

(56) References Cited

U.S. PATENT DOCUMENTS

| 9,706,395 B2 | 7/2017 | Forsberg ............... H04L 53/123 |
| 2011/0092213 A1 | 4/2011 | Forsberg et al. |

(Continued)

FOREIGN PATENT DOCUMENTS

| CN | 101686233 A | 3/2010 |
| CN | 101784086 A | 7/2010 |

(Continued)

OTHER PUBLICATIONS

3GPP TS 23.501, V0.3.1 (Mar. 2017), "3rd Generation Partnership Project: Technical Specification Group Services and System Aspects: System Architecture for the 5G System; Stage 2 (Release 15)," Mar. 2017, pp. 1-97.

(Continued)

*Primary Examiner* — Wayne H Cai
(74) *Attorney, Agent, or Firm* — Sughrue Mion, PLLC

(57) ABSTRACT

A communication terminal (10) according to the present disclosure includes: a control unit (12) configured to, in a case of a movement from a communication area formed by the 5GS to a communication area formed by the EPS or a movement from a communication area formed by the EPS to a communication area formed by the 5GS, determine whether or not a communication system forming a commu-
(Continued)

nication area at a movement destination can satisfy requirements of services; and a communication unit (11) configured to, when it is determined that the communication system forming the communication area at the movement destination can satisfy the requirements of the services, send a connection request message to the communication system forming the communication area at the movement destination.

4 Claims, 11 Drawing Sheets

Related U.S. Application Data continuation of application No. 16/494,600, filed as application No. PCT/JP2018/010572 on Mar. 16, 2018, now Pat. No. 11,019,495.

(51) Int. Cl.
  *H04W 12/041* (2021.01)
  *H04W 12/08* (2021.01)
  *H04W 36/14* (2009.01)
  *H04W 48/18* (2009.01)

(52) U.S. Cl.
  CPC .......... *H04W 12/08* (2013.01); *H04W 36/14* (2013.01); *H04W 48/18* (2013.01)

(56) References Cited

U.S. PATENT DOCUMENTS

| | | | |
|---|---|---|---|
| 2018/0020386 A1 | 1/2018 | Chandramouli | H04W 36/0027 |
| 2019/0223093 A1 | 7/2019 | Watfa | H04W 36/06 |
| 2019/0261179 A1 | 8/2019 | Hu | H04L 63/0815 |
| 2019/0335316 A1 | 10/2019 | Kim | H04W 80/10 |
| 2020/0015128 A1 | 1/2020 | Stojanovski | H04W 36/0022 |
| 2020/0077317 A1 | 3/2020 | Sharma | H04W 36/08 |
| 2020/0092710 A1 | 3/2020 | Kim | H04W 8/06 |
| 2020/0112894 A1 | 4/2020 | Koshimizu | H04W 36/0022 |
| 2020/0115130 A1 | 4/2020 | Reyzis | A45D 29/00 |
| 2020/0245404 A1 | 7/2020 | Suh | H04W 8/08 |
| 2020/0267617 A1 | 8/2020 | Larsen | H04W 36/14 |

FOREIGN PATENT DOCUMENTS

| | | |
|---|---|---|
| CN | 105704764 A | 6/2016 |
| EP | 3534644 A1 | 9/2019 |
| JP | 2020-509648 A | 3/2020 |
| WO | 2015/160329 A1 | 10/2015 |
| WO | 2016/126238 A1 | 8/2016 |
| WO | 2018/137824 A1 | 8/2018 |

OTHER PUBLICATIONS

3GPP TSG-SA Meeting #75, Tdoc SP-170096, "Presentation of Specification/Report to TSG: TR 33.899, Version 1.0.0,", SA3, Mar. 8-10, 2017, 472 pages.
3GPP TSG SA WG3 (Security) Meeting #86bis, S3-170823, "pCR to TR 33.899: Solution for key issue #13.1,", NEC, Mar. 27-31, 2017, 4 pages.
International Search Report of PCT/JP2018/010572 dated Jun. 5, 2018.
Ericsson, "Solution on inter-working handover from 5G Next Gen to EPC using Nx interface", 3GPP TSG SA WG3 (Security) Meeting #86-Bis, Mar. 27-31, 2017, S3-170791 (3 pgs. total).
The Extended European Search Report dated Dec. 3, 2019, issued by the European Patent Office in corresponding application No. 18767595.4.
3rd Generation Partnership Project; Technical Specification Group Services and System Aspects; Study on the security aspects of the next generation system (Release 14), 3GPP TR 33.899, V1.0.0 (Mar. 2017), Technical Report, Mar. 9, 2017 (471 pgs. total).
3rd Generation Partnership Project; Technical Specification Group Services and System Aspects; Rational and track of security decisions in Long Term Evolved (LTE) RAN / 3GPP System Architecture Evolution (SAE) (Release 9), 3GPP TR 33.821, V9.0.0 (Jun. 2009), Technical Report, Jun. 11, 2009 (141 pgs. total).
Communication dated Jun. 23, 2020, from the Japanese Patent Office in Application No. 2019-506313.
3GPP TS 23.502, V0.2.0 (Feb. 2017), "3rd Generation Partnership Project; Technical Specification Group Services and System Aspects; Procedures for the 5G System Stage 2 (Release 15)", Feb. 2017, pp. 1-71.
I3GPP TS 23.401 V14.3.0 (Mar. 2017). "3rd Generation Partnership Project; Technical Specification Group Services and System Aspects; General Packet Radio Service (GPRS) enhancements for Evolved Universal Terrestrial Radio Access Network (E-UTRAN) access (Release 14)", Mar. 2017, pp. 1-386.
3GPP TS 22.261 V2.0.0 (Mar. 2017), "3rd Generation Partnership Project; Technical Specification Group Services and System Aspects; Service requirements for the 5G system; Stage 1 (Release 15)", Mar. 2017, pp. 1-48.
Ericsson, "23.501: 5GC-EPC interworking", 3GPP S2-170804 SA WG2 Meeting #119, Feb. 13-17, 2017, pp. 1-7, Croatia.
Huawei, "Inter-system mobility cases", 3GPP R3-170228 TSG-RAN WG3 AH, Jan. 17-19, 2017 ,USA.
Intel, "23.502: Way forward for NGC-EPC interworking", 3GPP S2-170333 TSG SA WG2 Meeting #11 8bis, Jan. 16-20, 2017, pp. 1-3 ,USA.
Nokia, "TS 23.502: P-CR for Single Registration-based Interworking from EPS to 5GS procedure", 3GPP S2-171013 SA WG2 Meeting #119, Feb. 13-17, 2017, pp. 1-5, Croatia.
Zte, "NW Silcing Mobility in Inter-System Scenario", 3GPP R3-170538 TSG RAN WG3 Meeting #85, Feb. 13-17, 2017, pp. 1-2, Greece.
NEC, "Slice Impacts on Mobility: Further considerations", 3GPP R3-170138 TSG-RAN WG3 Meeting #Ad-hoc, Jan. 17-19, 2017, pp. 1-2, USA.
Chinese Office Action for CN Application No. 201880032545.7 dated Mar. 29, 2021 with English Translation.
Indian Office Action for IN Application No. 201947041118 dated Sep. 8, 2021.
Chinese Office Action for CN Application No. 201880032545.7 dated Nov. 1, 2021 with English Translation.
3GPP TS 24.301 V14.2.0 (Dec. 2016).
3GPP TS 23.401 V14.2.0 (Dec. 2016).
3GPP TR 23.799 V14.0.0 (Dec. 2016).
3GPP TS 29.274 V14.2.0 (Dec. 2016).
Chinese Office Communication for CN Application No. 201880032545.7 dated Jun. 13, 2022 with English Translation.
Qualcomm Incorporated, "23.501—PDU Session mobility between systems for EPS interworking", SA WG2 Meeting #S2-119, S2-170759, Feb. 13-17, 2017.
JP Office Action for JP Application No. 2022-077622, dated Apr. 25, 2023 with English Translation.
Nokia et al., "Resolving editor's notes in Solution 18.2", 3GPP TSG SA WG2 #118, S2-167077, Nov. 18, 2016, pp. 1-12.

COMMUNICATION TERMINAL, NETWORK DEVICE, COMMUNICATION METHOD, AND NON-TRANSITORY COMPUTER READABLE MEDIUM

CROSS-REFERENCE TO RELATED APPLICATIONS

This application is a continuation of U.S. patent application Ser. No. 17/201,280, filed Mar. 15, 2021, which is a continuation of U.S. patent application Ser. No. 16/494,600, filed Sep. 16, 2019, which issued as U.S. Pat. No. 11,019,495, which is based on International Application No. PCT/JP2018/010572, filed Mar. 16, 2018, which claims priority from Indian Application No. 201711009358, filed Mar. 17, 2017, the contents of all of which are incorporated herein by reference in their entirety.

TECHNICAL FIELD

The present disclosure relates to a communication terminal, a network device, a communication method, and a program.

BACKGROUND ART

In the 3rd generation partnership project (3GPP), an evolved packet system (EPC) including a radio access network using long term evolution (LTE) and the like and a core network using evolved packet core (EPC) is stipulated. Further, in the 3GPP, a 5G system (5GS) including a radio access network using a radio communication method referred to as so-called 5 generation (5G) and a core network using 5G core (5GC) is stipulated. In the years to come, it is expected for user equipment (UE), which is a communication terminal, to be able to use both systems. In 3GPP TS 23.501, a system configuration including both the EPS and the 5GS is disclosed.

CITATION LIST

Non Patent Literature

3GPP TS 23.501

SUMMARY OF INVENTION

Technical Problem

In 3GPP TS 23.501, however, specific processing when UE switches a communication system to be used between the EPS and the 5GS is not disclosed. For this reason, there is a problem in that, when UE has moved, a communication system that the UE uses cannot be switched between the EPS and the 5GS and the UE cannot use a communication system provided in an area to which the UE has moved.

In consideration of the above-described problem, an object of the present disclosure is to provide a communication terminal, a network device, a communication method, and a program capable of coping with switching of communication systems between the EPS and the 5GS.

Solution to Problem

A communication terminal according to a first aspect of the present disclosure includes a control unit configured to, in a case of a movement from a communication area formed by a 5 generation system (5GS) to a communication area formed by an evolved packet system (EPS) or a movement from a communication area formed by the EPS to a communication area formed by the 5GS, determine whether or not a communication system forming a communication area at a movement destination can satisfy requirements of services, and a communication unit configured to, when it is determined that the communication system forming the communication area at the movement destination can satisfy the requirements of the services, send a connection request message to the communication system forming the communication area at the movement destination.

A network device according to a second aspect of the present disclosure includes a control unit configured to, when a communication terminal has moved from a communication area formed by a 5 generation system (5GS) to a communication area formed by an evolved packet system (EPS) or the communication terminal has moved from a communication area formed by the EPS to a communication area formed by the 5GS, determine whether or not a communication system forming a communication area at a movement destination of the communication terminal can satisfy requirements of services, and a communication unit configured to, when it is determined that the communication system forming the communication area at the movement destination of the communication terminal can satisfy the requirements of the services, send a relocation request message to the communication system forming the communication area at the movement destination.

A communication method according to a third aspect of the present disclosure includes, in a case of a movement from a communication area formed by a 5 generation system (5GS) to a communication area formed by an evolved packet system (EPS) or a movement from a communication area formed by the EPS to a communication area formed by the 5GS, determining whether or not a communication system forming a communication area at a movement destination can satisfy requirements of services, and, when it is determined that the communication system forming the communication area at the movement destination can satisfy the requirements of the services, sending a connection request message to the communication system forming the communication area at the movement destination.

A program according to a fourth aspect of the present disclosure causes a computer to perform a method including, in a case of a movement from a communication area formed by a 5 generation system (5GS) to a communication area formed by an evolved packet system (EPS) or a movement from a communication area formed by the EPS to a communication area formed by the 5GS, determining whether or not a communication system forming a communication area at a movement destination can satisfy requirements of services, and, when it is determined that the communication system forming the communication area at the movement destination can satisfy the requirements of the services, sending a connection request message to the communication system forming the communication area at the movement destination.

Advantageous Effects of Invention

The present disclosure enables a communication terminal, a network device, a communication method, and a program capable of coping with switching of communication systems between the EPS and the 5GS to be provided.

DESCRIPTION OF EMBODIMENTS

First Example Embodiment

Figure 1:
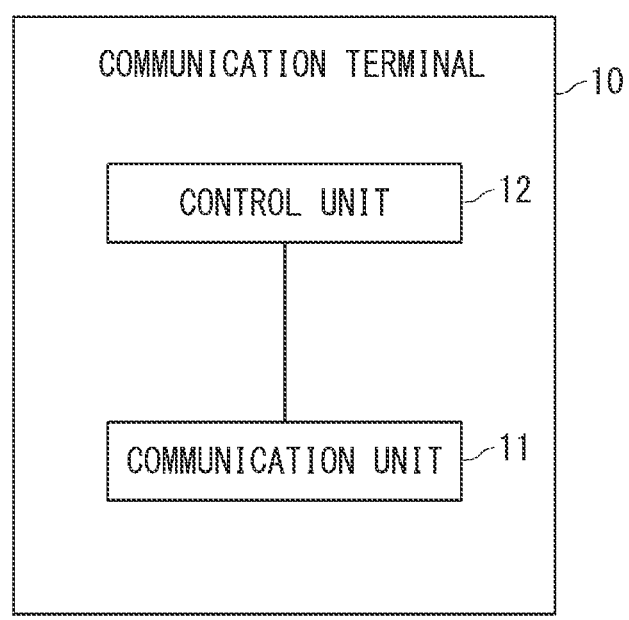
FIG. 1 is a block diagram of a communication terminal according to a first example embodiment.

Hereinafter, with reference to the drawings, an example embodiment of the present disclosure will be described. First, using FIG. 1, a configuration example of a communication terminal 10 according to a first example embodiment will be described. The communication terminal 10 may be a computer device that operates by a processor executing programs stored in a memory. The communication terminal 10 may be, for example, a mobile phone terminal, a smartphone terminal, or a tablet-type terminal. In addition, the communication terminal 10 may be an Internet of things (IoT) terminal or a machine type communication (MTC) terminal.

The communication terminal 10 includes a communication unit 11 and a control unit 12. The communication unit 11 and the control unit 12 may be software or modules the processing of which is performed by the processor executing programs stored in the memory. Alternatively, the communication unit 11 and the control unit 12 may be hardware, such as a circuit and a chip.

A case where the communication terminal 10 has moved from a communication area formed in the 5GS to a communication area formed in the EPS or the communication terminal 10 has moved from a communication area formed in the EPS to a communication area formed in the 5GS will be described. In this case, the control unit 12 determines whether or not a communication system forming the communication area at the movement destination can satisfy requirements of services.

A communication area formed by the 5GS may be, for example, a cell that a g node B (gNB) used in the 5GS defines as a communication area. A communication area formed by the EPS may be, for example, a cell that an evolved node B (eNB) used in the EPS defines as a communication area.

The expression "the communication terminal 10 moves" may mean, for example, that the communication terminal 10, while, although registered to a communication system of either the EPS or the 5GS, not performing communication, moves to an area formed by the other communication system. Alternatively, the expression "the communication terminal 10 moves" may mean that the communication terminal 10, while performing communication using a communication system of either the EPS or the 5GS, moves to an area formed by the other communication system.

The 5GS and the EPS respectively provide communication services. In other words, the 5GS and the EPS provide the communication terminal 10 with services relating to data transmission. Requirements of the communication services provided by the 5GS and the EPS are determined by a service provider and the like. The requirements may, for example, be requirements on delay, throughput, a security algorithm, or the like. For example, the security level varies depending on a provided security algorithm.

The services with respect to which the control unit 12 determines whether or not requirements are satisfied may be, for example, services that the communication terminal 10 can use. Information on the services that the communication terminal 10 can use may be stored in the communication terminal 10 in advance. Alternatively, the services with respect to which the control unit 12 determines whether or not requirements are satisfied may be services that the communication terminal 10 is currently using.

The control unit 12 may have information on capabilities of the respective communication systems with respect to the requirements of the services, such as requirements on delay, throughput, or a security algorithm. Further, the control unit 12 may have information on the requirements of the services in advance.

The control unit 12, using information that the control unit 12 has, determines whether or not a communication system forming the communication area at the movement destination of the communication terminal 10 satisfies the requirements of the services.

When it is determined that the communication system forming the communication area at the movement destination can satisfy the requirements of the services, the communication unit 11 sends a connection request message to the communication system forming the communication area at the movement destination.

As described thus far, when the communication terminal 10 has moved between a communication area formed by the 5GS and a communication area formed by the EPS, the communication terminal 10 determines whether or not a communication system forming the communication area at the movement destination can satisfy requirements of services. Further, the communication terminal 10 sends a connection request message to the communication system that can satisfy the requirements of the services. As a consequence, the communication terminal 10 can also receive services continuously in the communication system forming the communication area at the movement destination. That is, since the communication terminal 10 can also receive services that the communication terminal 10 desires to use in the communication system forming the communication area at the movement destination, the communication terminal 10 can switch the communication systems.

Second Example Embodiment

Figure 2:
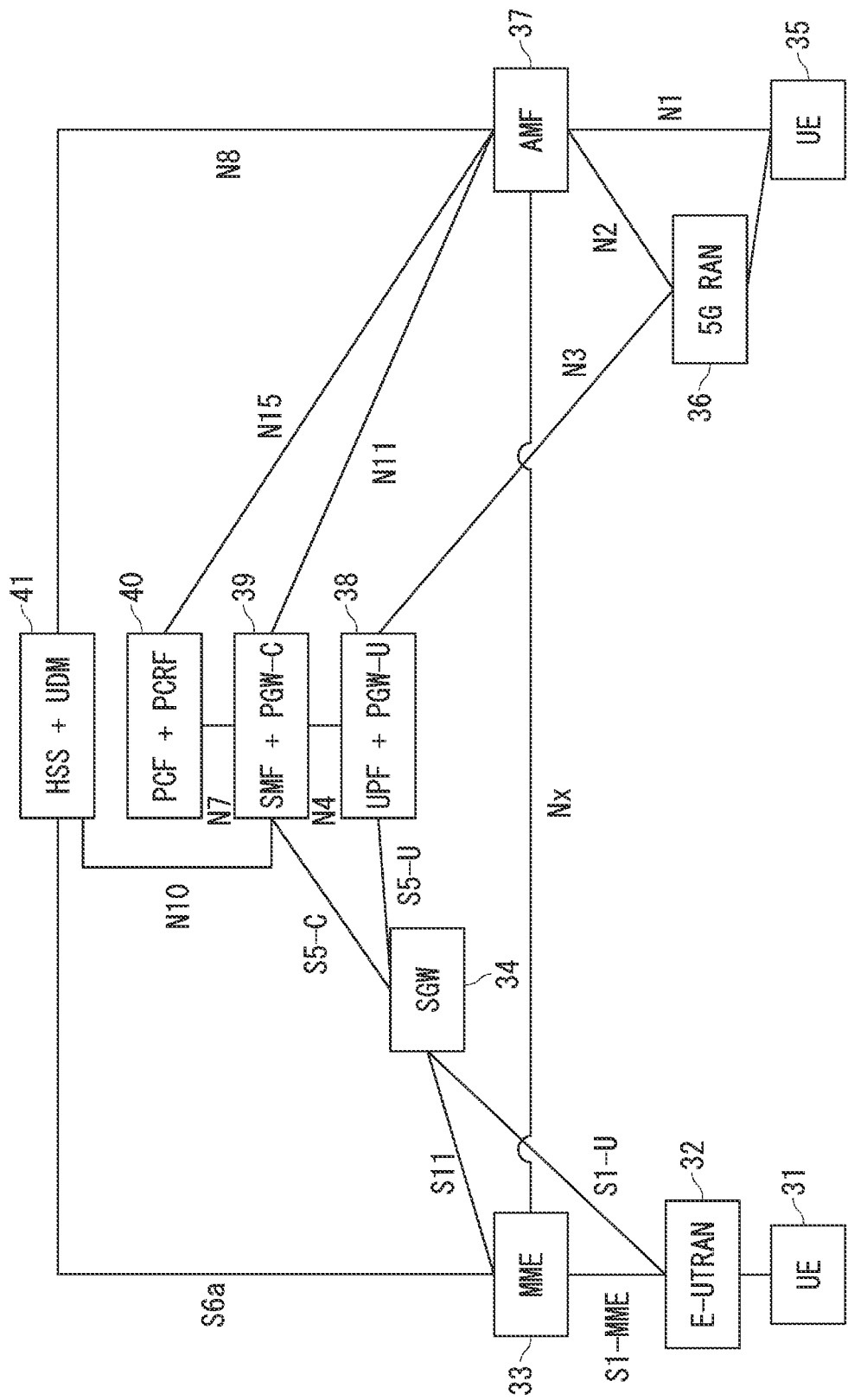
FIG. 2 is a block diagram of a communication system according to a second example embodiment.

Next, using FIG. 2, a configuration example of a communication system according to a second example embodiment will be described. The communication system in FIG. 2 includes node devices stipulated in the 3GPP. Specifically, the communication system in FIG. 2 includes user equipment (UE) 31, an E-UTRAN 32, a mobility management entity (MME) 33, a serving gateway (SGW) 34, UE 35, a 5G RAN 36, an access and mobility management function (AMF) entity 37 (hereinafter, referred to as an AMF 37), a user plane function (UPF)+packet data network gateway (PGW)-U 38, a session management function (SMF)+PGW-C 39, a policy control function (PCF)+policy and charging rules function (PCRF) entity 40 (hereinafter, referred to as a PCF+PCRF 40), and a home subscriber server (HSS)+unified data management (UDM) 41. Note that an entity may be rephrased as a node device or a device.

The UE 31 and the UE 35 are used as general terms for communication terminals in 3GPP. The E-UTRAN 32 is a radio access network using LTE as a radio communication standard. The E-UTRAN 32, for example, communicates with the UE 31, using an evolved node B (eNB) as a base station.

The MME 33 is a device that mainly performs mobility management of the UE 31 and issues a bearer setting request, a bearer setting instruction, a bearer deletion request, and a bearer deletion instruction. In addition, the MME 33 performs authentication processing of the UE 31 in cooperation with the HSS+UDM 41.

The SGW 34 is a device that is connected to the E-UTRAN 32 and transfers user (U)-plane data between the E-UTRAN 32 and the UPF+PGW-U 38. The U-plane data may be rephrased as user data. Note that the MME 33 and the SGW 34 are node devices arranged within the EPC.

The 5G RAN 36 is a radio access network using a next-generation radio communication standard after LTE as a radio communication standard. The next-generation radio communication standard may be referred to as, for example, 5G or new radio (NR). The 5G RAN 36, for example, communicates with the UE 35, using a gNB as a base station. In addition, the 5G RAN 36 may communicate with UE 31 handed over from a communication area formed by the E-UTRAN 32. Moreover, the E-UTRAN 32 may communicate with UE 35 handed over from a communication area formed by the 5G RAN 36.

In addition, the 5G RAN 36 transfers U-plane data between the UE 35 and the UPF+PGW-U 38.

The AMF 37 performs mobility management with respect to the UE 35 and authentication processing with respect to the UE 35 in cooperation with the PCF+PCRF 40 or the HSS+UDM 41. The AMF 37 is a node device arranged within the 5G core network.

The UPF+PGW-U 38, the SMF+PGW-C 39, the PCF+PCRF 40, and the HSS+UDM 41 perform interworking between the 5G RAN 36 and 5G core network and the E-UTRAN 32 and EPC. Specifically, the UPF+PGW-U 38 communicates with the SGW 34 and the 5G RAN 36. The SMF+PGW-C 39 communicates with the SGW 34 and the AMF 37. The HSS+UDM 41 communicates with the MME 33 and the AMF 37. The PCF+PCRF 40 communicates with the AMF 37. Further, the PCF+PCRF 40 communicates with the MME 33 via the SMF+PGW-C 39 and the SGW34.

The UPF+PGW-U 38 transfers user data between the 5G core network and the EPC. The SMF+PGW-C 39 transfers control (C)-plane data between the 5G core network and the EPC and, for example, transfers information on session management. The PCF+PCRF 40 transfers information on policy information between the 5G core network and the EPC. The HSS+UDM 41 manages subscriber data of the UE 35, which performs communication via the 5G core network, and the UE 31, which performs communication via the EPC.

Reference points that are set between respective nodes in the communication system in FIG. 2 will be described below. The reference points may be replaced with interfaces. Note that the names of the reference points described below may be changed associated with an update in the standards.

Between the E-UTRAN 32 and the MME 33, an S1-MME reference point is defined. Between the E-UTRAN 32 and the SGW 34, an S1-U reference point is defined. Between the MME 33 and the SGW 34, an S11 reference point is defined. Between the SGW 34 and the UPF+PGW-U 38, an S5-U reference point is defined. Between the SGW 34 and the SMF+PGW-C 39, an S5-C reference point is defined. Between the MME 33 and the HSS+UDM 41, an S6a reference point is defined.

Between the UE 35 and the AMF 37, an N1 reference point is defined. Between the 5G RAN 36 and the AMF 37, an N2 reference point is defined. Between the 5G RAN 36 and the UPF+PGW-U 38, an N3 reference point is defined. Between the AMF 37 and the SMF+PGW-C 39, an N11 reference point is defined. Between the AMF 37 and the PCF+PCRF 40, an N15 reference point is defined. Between the AMF 37 and the HSS+UDM 41, an N8 reference point is defined.

Between the UPF+PGW-U 38 and the SMF+PGW-C 39, an N4 reference point is defined. Between the SMF+PGW-C 39 and the PCF+PCRF 40, an N7 reference point is defined. Between the SMF+PGW-C 39 and the HSS+UDM 41, an N10 reference point is defined. Further, between the MME 33 and the AMF 37, an Nx reference point is defined.

Next, using FIG. 3, a hierarchical structure of security keys used in the EPS will be described.

A universal subscriber identification module (USIM) may be a module configured to store subscriber information with respect to the UE 31. An authentication center (AuC) (not-illustrated) is a node device that is arranged in the core network and configured to perform processing relating to security. The USIM and the AuC respectively have a security key K.

The USIM and the AuC derive a cipher key CK and an integrity key IK from the security key K. The USIM outputs the cipher key CK and the integrity key IK to the UE 31, and the AuC sends the cipher key CK and the integrity key IK to the HSS+UDM 41. The HSS+UDM 41 is a node device configured to manage subscriber information with respect to UE.

The UE 31 and the HSS+UDM 41 derive a security key $K_{ASME}$ from the cipher key CK and the integrity key IK. The HSS+UDM 41 sends the security key $K_{ASME}$ to the MME 33. The UE 31 and the MME 33 generate a security key $K_{NASenc}$, a security key $K_{NASint}$, and a security key $K_{eNB}$/NH from the security key $K_{ASME}$.

The security key $K_{NASenc}$ is used for encryption of a NAS message transmitted between the UE 31 and the MME 33. The security key $K_{NASint}$ is used for integrity protection of a NAS message transmitted between the UE 31 and the MME 33.

The MME 33 sends the security key $K_{eNB}$/NH to an eNB. The eNB is, for example, a base station included in the E-UTRAN 32.

The UE 31 and the eNB generate a security key $K_{UPint}$, a security key $K_{UPenc}$, a security key $K_{RRCint}$, and a security key $K_{RRCenc}$ from the security key $K_{eNB}$/NH. The security key $K_{UPint}$ is used for integrity protection of user data. The security key $K_{UPenc}$ is used for encryption of user data. The security key $K_{RRCenc}$ is used for encryption of a radio resource control (RRC) message. The security key $K_{RRCint}$ is used for integrity protection of an RRC message.

Next, using FIG. 4, a configuration of security keys used in the 5GS will be described.

The UE 35 and the HSS+UDM 41 have a security key K. The security key K may be referred to as a master key K. The HSS+UDM 41 may perform an authentication credential repository and processing function (ARPF).

The UE 35 and the HSS+UDM 41 derive a security key $K_{SEAF}$ from the security key K. Alternatively, the UE 35 and the HSS+UDM 41 may derive a ciphering key CK used for encryption and an integrity key IK used for integrity protection processing from the security key K. Further, the UE 35 and the HSS+UDM 41 may derive the security key $K_{SEAF}$ from the security key K or the CK and IK. The HSS+UDM 41 sends the security key $K_{SEAF}$ to the AMF 37.

The UE 35 and the AMF 37 derive a security key $K_{3GPP\_AN}$, a security key $K_{non-3GPP\_AN}$, a security key $K_{NAS\_MM}$, a security key(s) $K_{NAS\_SM}$, a security key $K_{AN\_other}$, and a security key $K_{AN/NH}$ from the security key $K_{SEAF}$.

The UE 35 and the AMF 37, using information identifying a network slice in which the SMF+PGW-C 39 is arranged, derive a security key $K_{NAS\_SM}$ from the security key $K_{SEAF}$ with respect to each network slice.

The security key $K_{3GPP\_AN}$ is a security key used in an access network before LTE. Access networks before LTE include, for example, an access network using a communication method referred to as LTE, 3G, or 2G. The security key $K_{non-3GPP\_AN}$ is a security key used in an access network that is not stipulated in the 3GPP. The security key $K_{AN\_other}$ is a security key different from the security keys $K_{3GPP\_AN}$ and $K_{non-3GPP\_AN}$.

The security key $K_{NAS\_MM}$ is used in MM processing. The security key $K_{NAS\_SM}$ is used in session management (SM) processing.

The UE 35 and the AMF 37 derive a security key $K_{NAS-MMenc}$ and a security key $K_{NAS-MMint}$ from the security key $K_{NAS\_MM}$. The security key $K_{NAS-MMenc}$ is used for encryption of an MM message. The security key $K_{NAS-MMint}$ is used for integrity protection processing of an MM message.

The AMF 37 sends a security key(s) $K_{NAS}\_S_M$ to the SMF+PGW-C 39. Further, the AMF 37 sends the security key $K_{AN/NH}$ to the 5G RAN 36.

The SMF+PGW-C 39 derives a security key $K_{NAS-SMenc}$ and a security key $K_{NAS-SMint}$ from a security key $K_{NAS\_SM}$. Further, the SMF+PGW-C 39 derives a security key $K_{UP}$ from the security key $K_{NAS\_SM}$.

The security key $K_{NAS-SMenc}$ is used for encryption of an SM message. The security key $K_{NAS-SMint}$ is used for integrity protection processing of an SM message. The security key $K_{UP}$ is applied to U-plane data.

The SMF+PGW-C 39 derives a security key $K_{Sess1enc}$ and a security key $K_{Sess1int}$ from a security key $K_{UP}$. The security keys $K_{Sess1enc}$ and $K_{Sess1int}$ are, for example, used in a network slice assumed to be referred to as a network slice 1. Security keys $K_{SessNenc}$ and $K_{SessNint}$ are used in a network slice assumed to be referred to as a network slice N (N is an integer equal to or greater than 1). The security key $K_{SessNenc}$ is used for encryption of U-plane data. The security key $K_{SessNint}$ is used for integrity protection processing of U-plane data.

The 5G RAN 36 derives a security key $K_{RRCenc}$, a security key $K_{RRCint}$, a security key $K_{UPenc}$, and a security key $K_{UPint}$ from the security key $K_{AN/NH}$. The security keys $K_{RRCenc}$, $K_{RRCint}$, $K_{UPenc}$, and $K_{UPint}$ are security keys used in a radio section.

Figure 3:
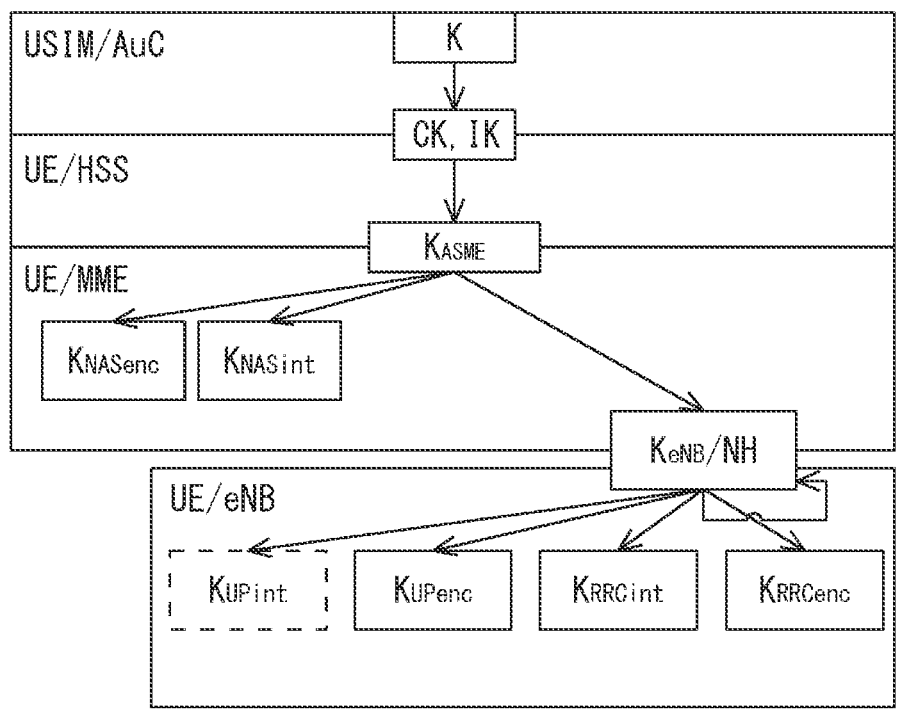
FIG. 3 is a diagram illustrating a hierarchical structure of security keys used in an EPS according to the second example embodiment.
Figure 4:
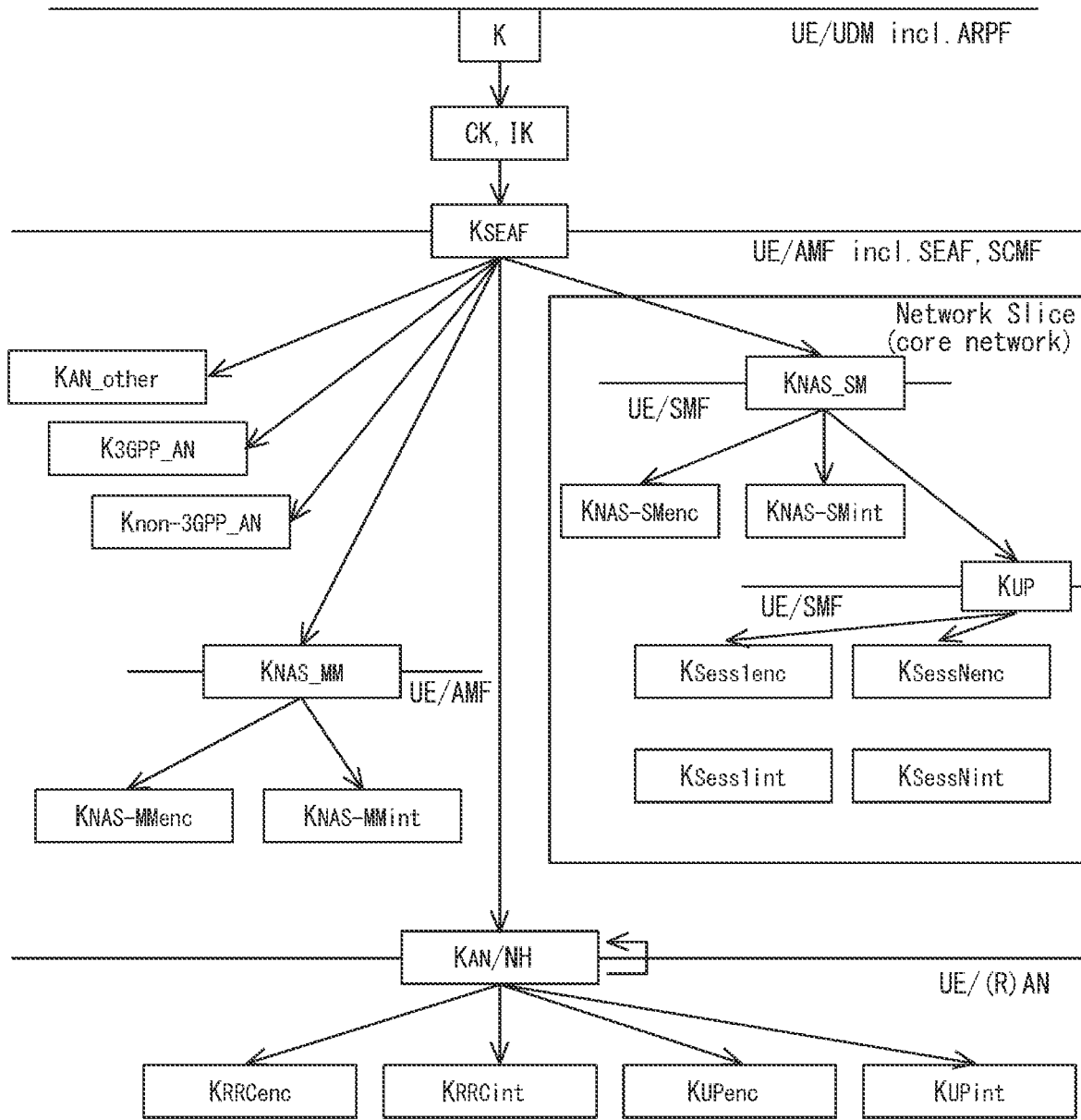
FIG. 4 is a diagram illustrating a hierarchical structure of security keys used in a 5GS according to the second example embodiment.

When the UE 31 and the UE 35 are identical UE and connect to both the EPS and the 5GS, the security keys K, the cipher keys CK, and the integrity keys IK illustrated in FIGS. 3 and 4 may be respectively the same. In this case, the security key $K_{ASME}$ and the security key $K_{SEAF}$ are derived from the same security key K or the same cipher key CK and integrity key IK. Alternatively, the security key $K_{ASME}$ may be derived from the security key $K_{SEAF}$. Still alternatively, the security key $K_{SEAF}$ may be derived from the security key $K_{ASME}$.

In addition, when the UE 31 and the UE 35 are identical UE and connect to both the EPS and the 5GS, security keys used for the NAS and the AS in the 5GS may also be used in the EPS. For example, as security keys used for encryption and integrity protection of a NAS message in the EPS, the security keys $K_{NAS-MMenc}$ and $K_{NAS-MMint}$ may be used. Further, as security keys used for encryption and integrity protection of an AS message in the EPS, the security keys generated in the 5GS may be used. Specifically, the security keys $K_{RRCenc}$, $K_{RRCint}$, $K_{UPenc}$, and $K_{UPint}$ generated in the 5GS may be used. Alternatively, as security keys used for encryption and integrity protection of an AS message in the EPS, the security key $K_{3GPP\_AN}$ generated in the 5GS may be used.

Figure 5:
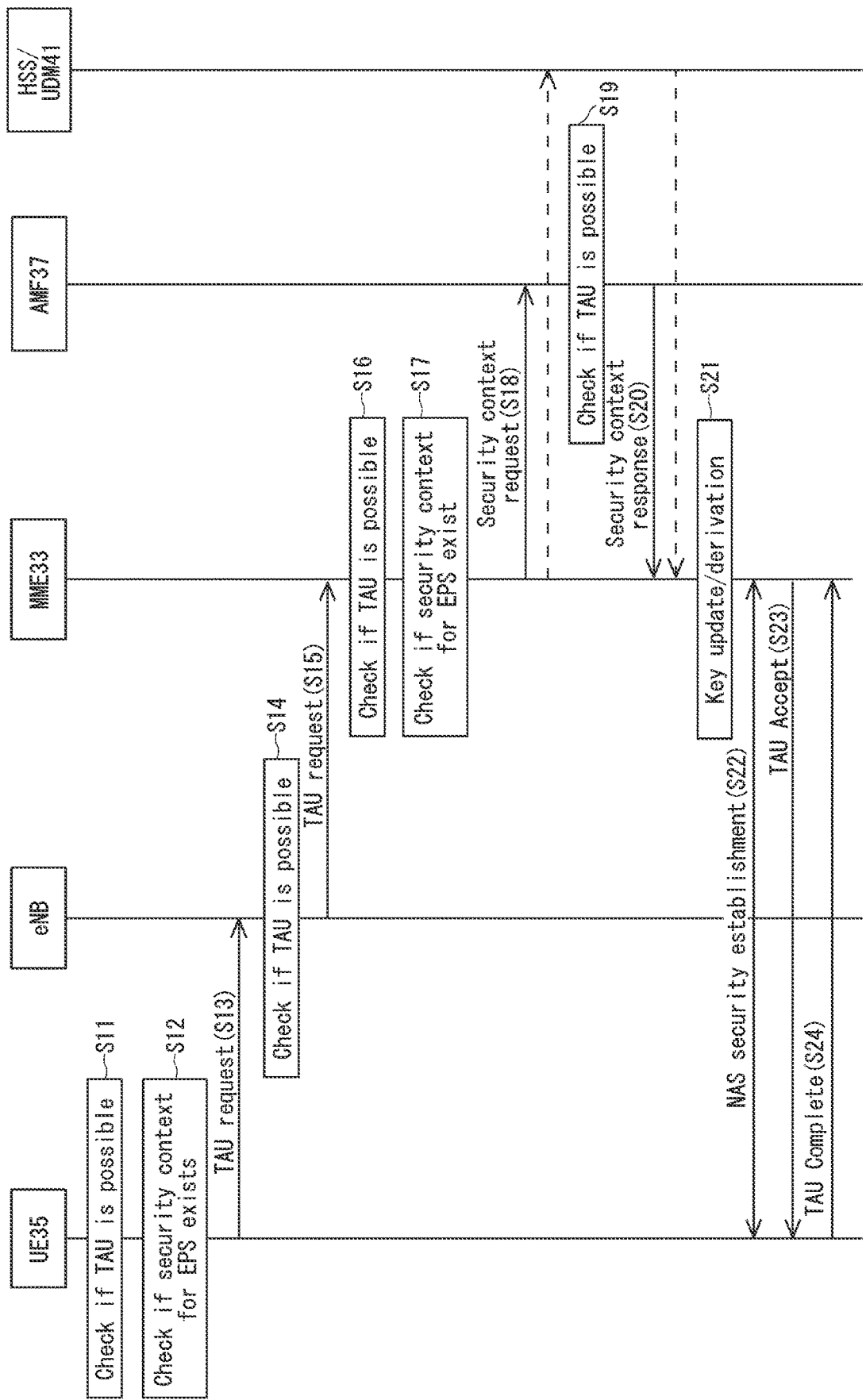
FIG. 5 is a diagram illustrating a processing flow when UE in an idle mode according to the second example embodiment has moved.

Next, using FIG. 5, a processing flow when the UE 35 that is in an idle mode moves from a communication area formed by the 5GS to a communication area formed by the EPS will be described. In FIG. 5, a communication method relating to respective network devices including the UE 35 is illustrated. The UE 35, the eNB, the MME 33, and the AMF 37 have radio access information on a radio access network to which the UE 35 can connect and coverage area information of services. The radio access information is, for example, information identifying an area, a cell, an eNB, or a gNB to which the UE 35 can connect. Further, the UE 35, the eNB, the MME 33, and the AMF 37 have at least one type of information on allowed areas, non-allowed areas, and forbidden areas with respect to the UE 35.

When the UE 35 moves from the 5GS to the EPS, first, the UE 35 checks if tracking area update (TAU) processing can be performed or not (S11). For example, the UE 35 performs the check, based on at least one of the UE's capability, security capability, radio access information, requirements of services, and the operator's policy, which are required for connecting to the eNB.

The security capability is, for example, an algorithm of encryption and integrity protection that the UE 35 supports. The radio access information is information that the UE 35 has. The requirements of services are requirements of services provided to the UE 35.

Next, when the TAU processing can be performed, the UE 35 also checks if a security context for the EPS exists or not (S12). The security context may be, for example, a root key, such as the security keys $K_{ASME}$ and $K_{SEAF}$.

Next, the UE 35 sends a TAU request message to the eNB (S13). When the UE 35 has a security context, the TAU request message may be protected in terms of encryption and integrity protection. Alternatively, on the TAU request message, only protection in terms of encryption may be performed. Security keys used for encryption and integrity protection may be derived from the root key or obtained by updating existing keys. When security keys are updated, NAS uplink count may be used. Whether the security keys are updated or whether protection in terms of encryption and integrity protection is performed may be determined based on lifetimes of the security keys or the operator's policy. The TAU request message includes a key set identifier (KSI) and the identifier of the UE 35. The identifier of the UE 35 may be, for example, a globally unique temporary identifier (GUTI). Further, the TAU request message may include information on a network slice or services provided to the UE 35. The information on a network slice may, for example, be sent as network slice selection assistance information (NSSAI). The TAU request message may be sent to the MME 33 directly.

Next, the eNB checks if the TAU processing with respect to the UE 35 can be performed or not, using a similar method to that used by the UE 35 in step S11 (S14). When the eNB has updated information on radio access of the UE 35, there is a possibility that a result of the check by the eNB is different from a result of a check by the UE 35 in step S11. The eNB, when determining that the TAU processing with respect to the UE 35 cannot be performed, may send, in conjunction with a response to the TAU request message, the radio access information to the UE 35.

Next, the eNB, when determining that the TAU processing with respect to the UE 35 can be performed, sends a TAU request message to the MME 33 (S15).

Next, the MME 33 checks if the TAU processing with respect to the UE 35 can be performed or not, using a similar method to that used by the UE 35 in step S11 (S16). The MME 33, when determining that the TAU processing with respect to the UE 35 cannot be performed, may send, in conjunction with a response to the TAU request message, the radio access information that the MME 33 has to the UE 35 and the eNB.

Next, the MME 33, when determining that the TAU processing with respect to the UE 35 can be performed, also checks if a security context for the EPS exists or not (S17).

Next, the MME 33, when not having a security context for the EPS, sends a security context request message to the AMF 37 or the HSS+UDM 41 (S18).

Next, the AMF 37 checks if the TAU processing with respect to the UE 35 can be performed or not, using a similar method to that used by the UE 35 in step S11 (S19). The AMF 37, when determining that the TAU processing with respect to the UE 35 cannot be performed, may send, in conjunction with a response to the TAU request message, the radio access information that the AMF 37 has to the MME 33, the UE 35, and the eNB.

Next, the AMF 37 or the HSS+UDM 41, when determining that the TAU processing with respect to the UE 35 can be performed, sends a response message including a security context to the MME 33 (S20). The security context is, for example, a root key, such as the security keys $K_{ASME}$ and $K_{SEAF}$. When the MME 33 has the security context, steps S18 to S20 may be omitted.

Next, the MME 33, as with the UE 35 in step S13, updates the root key and derives security keys used for performing protection in terms of integrity protection and encryption (S21). When there is downlink data or a TAU request message including an active flag, the MME 33 derives the security key $K_{eNB}$ and sends the security key $K_{eNB}$ to the eNB. Between the UE 35 and the MME 33, authentication and key agreement (AKA) may be performed.

Next, between the UE 35 and the MME 33, NAS security is established (S22). The NAS security may be used for protecting a TAU request message. When there is downlink data or a TAU request message including an active flag, AS security may be further established.

Next, the MME 33 sends a TAU accept message protected in the NAS security to the UE 35 (S23). In addition, when an MME different from the MME to which the UE 35 has connected is selected in the network, the identifier, such as a GUTI, of the UE 35 is included in the TAU accept message.

Next, the UE 35 sends a TAU complete message to the MME 33 (S24).

In this description, processing when the UE 35 moves from a communication area formed by the EPS to a communication area formed by the 5GS is also described as a similar procedure to that in the processing illustrated in FIG. 5. In this case, the eNB and the MME 33 are replaced with the gNB and the AMF 37, respectively. Further, the NAS security in step S22 in FIG. 5 is described as NAS MM security. In addition, the configurations of the NAS MM security and the AS security are changed depending on services.

Figure 6:
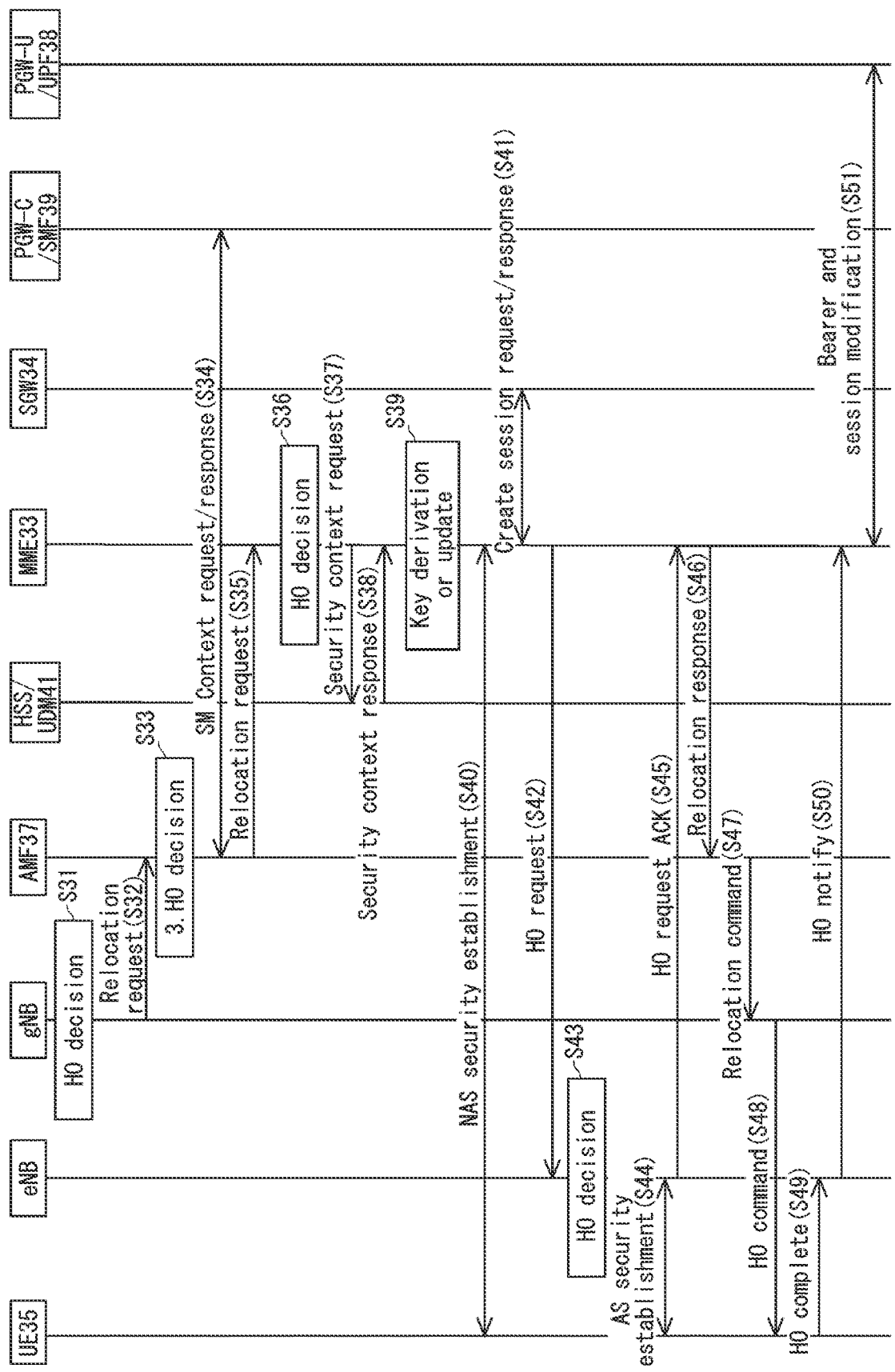
FIG. 6 is a diagram illustrating a processing flow when UE in a communication mode according to the second example embodiment has moved.

Next, using FIG. 6, a processing flow when the UE 35 that is in a communication mode moves from a communication area formed by the 5GS to a communication area formed by the EPS will be described. FIG. 6 illustrates a processing flow when the UE 35 is handed over from a communication area formed by the 5GS to a communication area formed by the EPS. In FIG. 6, a communication method relating to respective network devices including the UE 35 and the base stations (the eNB and the gNB) is illustrated.

First, the gNB checks whether or not the UE's capability and access rights are valid as information used for determining whether the gNB transmits a relocation request message (S31). The access rights are, for example, rights to access a radio access network that the UE 35 is allowed to access in an allowed area, a non-allowed area, and a forbidden area. Next, the gNB, when determining that the UE's capability and access rights are valid, sends a relocation request message to the AMF 37 (S32). The relocation request message includes the identifier (for example, a GUTI) of the UE 35, the UE's capability, the identifier of the gNB, and the identifier of the eNB at the movement destination.

Next, the AMF 37 checks whether or not the UE's capability and the access rights are valid as information used for determining whether the AMF 37 transmits a handover (HO) request message (S33). Next, the AMF 37 requests the SMF+PGW-C 39 to provide a session management (SM) context, and the SMF+PGW-C 39 sends the SM context to the AMF 37 (S34). When the UE 35 is capable of having multiple sessions, the AMF 37 sends request messages requesting an SM context to multiple SMF+PGW-C 39. In the next step and thereafter, various types of messages may be sent to multiple SGW 34, multiple SMF+PGW-C 39, and multiple UPF+PGW-U 38.

Next, the AMF 37 selects an MME and sends a relocation request message to the selected MME (S35). It is now assumed that the AMF 37 has selected the MME 33. The relocation request message includes the identifiers of the source gNB and the target eNB, a mobility management (MM) context, and an SM context. To the formats of the MM context and the SM context, a format used in the EPS is applied. The relocation request message may include a security context (for example, the security key $K_{SEAF}$), the identifiers of security keys, the identifier of a necessary security configuration, and an algorithm to be used. The identifiers of security keys may be, for example, a key set identifier (KSI). In addition, the necessary security configuration may be information indicating whether or not integrity protection and encryption are required.

Next, the MME 33 checks whether or not the UE's capability and the access rights are valid as information used for determining whether the MME 33 accepts the relocation request message (S36).

Next, the MME 33, when not having the necessary security context, sends a security context request message to the HSS+UDM 41 (S37). Next, the HSS+UDM 41 sends a security context response message to the MME 33 (S38). The security context response message includes the requested security context.

Next, the MME 33 derives security keys used in the EPS (S39). Next, NAS security is established between the UE 35 and the MME 33, based on the security configuration sent from the AMF 37 to the MME 33 in step S35 (S40).

Next, the MME 33 sends a create session request message to the SGW 34, based on the SM context. The SGW 34 allocates resources to a session with respect to the UE 35 and transmits a create session response message to the MME 33 (S41).

Next, the MME 33 sends a HO request message to the eNB (S42). The HO request message includes information on session and bearer establishment. The HO request message further includes a security context used for AS security, such as the security key $K_{eNB}$, and the security configuration sent from the AMF 37 to the MME 33 in step S35.

Next, the eNB checks whether or not the UE's capability and the access rights are valid as information used for determining whether the eNB accepts the HO request message (S43). Next, AS security is established between the UE 35 and the eNB, based on the security configuration (S44).

Next, the eNB allocates resources with respect to the UE 35 necessary for the bearer establishment and sends a HO request Ack message to the MME 33 (S45). Next, the MME 33 sends a relocation response message to the AMF 37 (S46). The relocation response message includes a HO command. The HO command includes necessary information, such as the identifier of the target eNB.

Next, the AMF 37 sends a relocation command message to the gNB (S47). The relocation command message includes the HO command. The AMF 37 deletes the security context for the UE 35 that is used in the 5GS.

Next, the gNB sends a HO command message to the UE 35 (S48). The gNB deletes the security context for the UE 35 that is used in the 5GS. Next, the UE 35 sends a HO complete message to the gNB (S49). Next, the eNB sends a HO notify message to the MME 33 (S50). Next, among the MME 33, the SGW 34, the SMF+PGW-C 39, and the UPF+PGW-U 38, bearer modification and session modification are performed (S51).

When respective devices perform checks in steps S31, S33, S36, and S13, the devices take into consideration requirements of services provided to the UE 35. When the target system (for example, the EPS) does not satisfy requirements of services having been provided to the UE 35 in the 5GS, a handover with respect to the UE 35 is not performed. The requirements of services are, for example, delay, throughput, a security algorithm, or the like.

When a real time property is required as a requirement of services provided to the UE 35, the MME 33 may receive the security key $K_{SEAF}$ from the AMF 37 in step S35. Further, the MME 33 may derive the security key $K_{ASME}$ from the security key $K_{SEAF}$.

Figure 7:
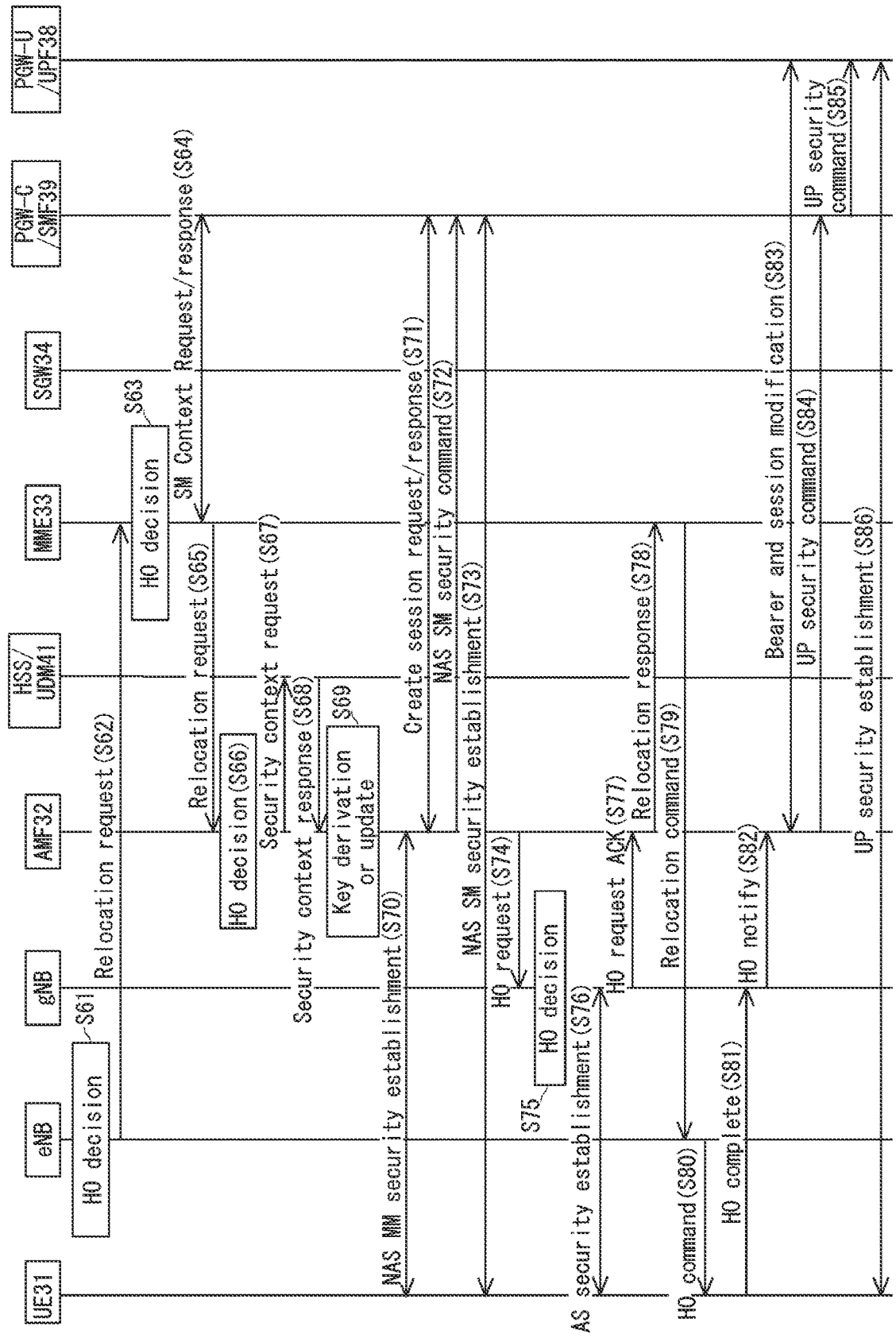
FIG. 7 is a diagram illustrating another processing flow when UE in the communication mode according to the second example embodiment has moved.

Next, using FIG. 7, a processing flow when the UE 31 that is in the communication mode moves from a communication area formed by the EPS to a communication area formed by the 5GS will be described. FIG. 7 illustrates a processing flow when the UE 31 is handed over from a communication area formed by the EPS to a communication area formed by the 5GS.

The procedure illustrated in FIG. 7 is described as a similar procedure to that in the processing illustrated in FIG. 6. Note, however, that the processing performed in the eNB and the MME 33 illustrated in FIG. 6 is performed in the gNB and the AMF 37, respectively, in FIG. 7. In addition, the processing performed in the gNB and the AMF 37 illustrated in FIG. 6 is performed in the eNB and the MME 33, respectively, in FIG. 7. Steps S61 to S69 in FIG. 7 are substantially the same as steps S31 to S39 in FIG. 6.

The NAS security established in step S40 in FIG. 6 is described as establishment of the NAS MM security in step S70 in FIG. 7. In addition, after step S71 in FIG. 7, the AMF 37 sends a NAS SM security command message to the SMF+PGW-C 39 (S72). Further, after step S72, NAS SM security is established between the UE 31 and the SMF+PGW-C 39 (S73).

Steps S74 to S83 in FIG. 7 are substantially the same as steps S42 to S51 in FIG. 6. In FIG. 7, after step S83, the AMF 37 sends a UP security command message to the SMF+PGW-C 39 (S84). The UP security command message includes security keys used for UP security. Next, the SMF+PGW-C 39 sends a UP security command message to the UPF+PGW-U 38 (S85). Next, between the UE 31 and the UPF+PGW-U 38, the UP security is established (S86).

Figure 8:
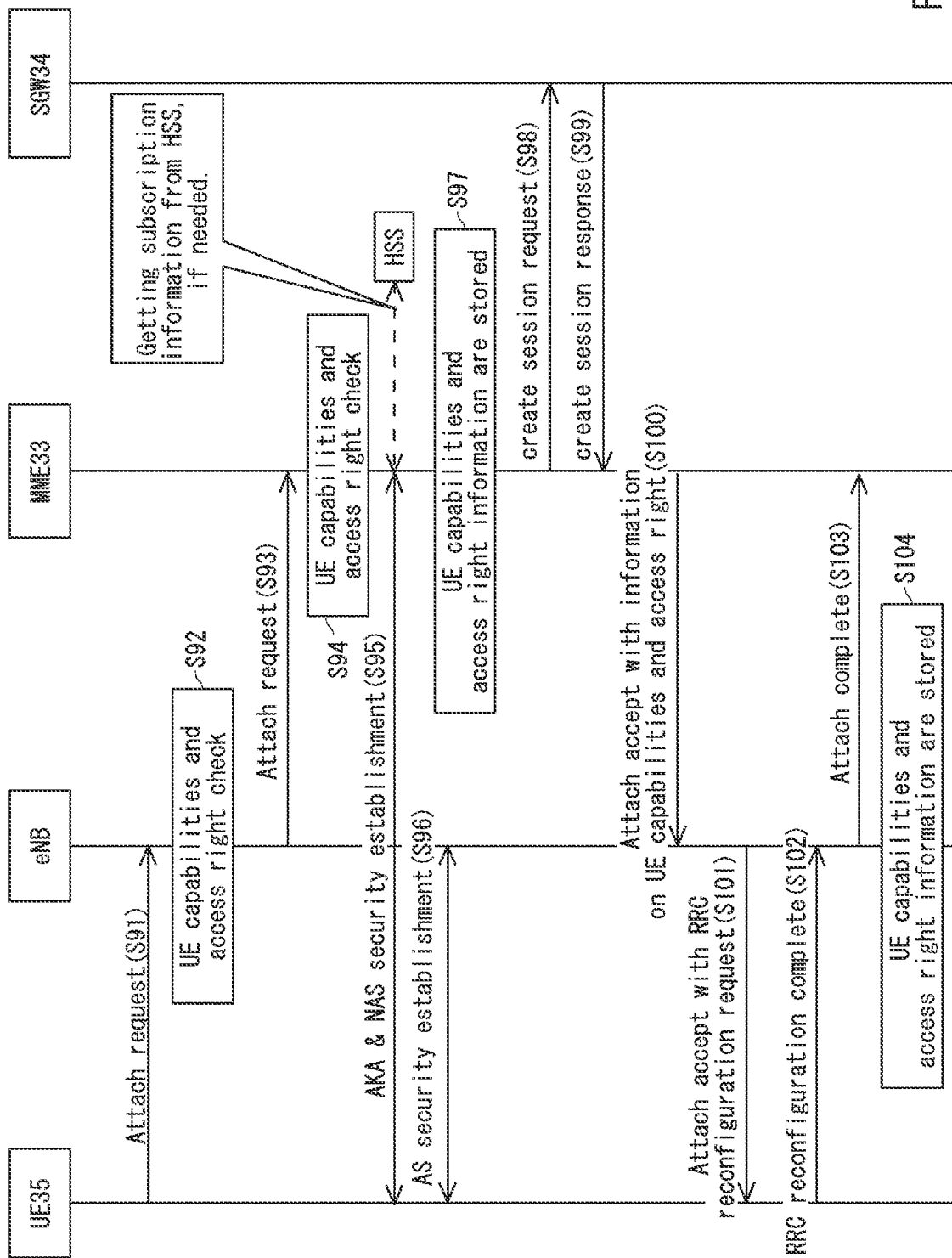
FIG. 8 is a diagram illustrating a processing flow of attach processing of UE according to the second example embodiment.

Next, using FIG. 8, a flow of attach processing that the UE 35 performs to the EPS will be described. It is assumed that the UE 35 has already performed register processing to the 5GS.

First, the UE 35 sends an attach request message to the eNB (S91). The attach request message includes the UE's capability on radio access and security. Next, the eNB checks whether or not the UE's capability and access rights are valid as information used for determining whether the eNB accepts the attach request message (S92). Next, when the eNB checks that the UE's capability and access rights are valid, the eNB sends an attach request message to the MME 33 (S93).

Next, the MME 33 checks whether or not the UE's capability and the access rights are valid as information used for determining whether the MME 33 accepts the attach request message (S94). Next, between the UE 35 and the MME 33, the AKA is performed and NAS security is established (NAS security establishment) (S95). In this step, when the MME 33 does not have necessary information to perform the AKA, the MME 33 acquires the necessary information from the HSS+UDM 41.

Next, between the UE 35 and the eNB, AS security is established (AS security establishment) (S96). Next, the MME 33 stores information on the UE's capability on radio access, information on security, and information on access rights (S97). The information on security (security capability) is added to the MME 33, based on security policy in the network or service requirements.

Next, the MME 33 sends a create session request message to the SGW 34 (S98). Next, the SGW 34 sends a create session response message to the MME 33 (S99). Next, the MME 33 sends an attach accept message to the eNB (S100). The attach accept message includes the UE's capability and access rights. Next, the eNB sends an attach accept message to the UE 35 (S101). The attach accept message includes an RRC reconfiguration request message.

Next, the UE 35 sends an RRC reconfiguration complete message to the eNB (S102). Next, the eNB sends an attach complete message to the MME 33 (S103). Next, the eNB stores information on the UE's capability and the access rights received from the MME 33 (S104).

Figure 9:
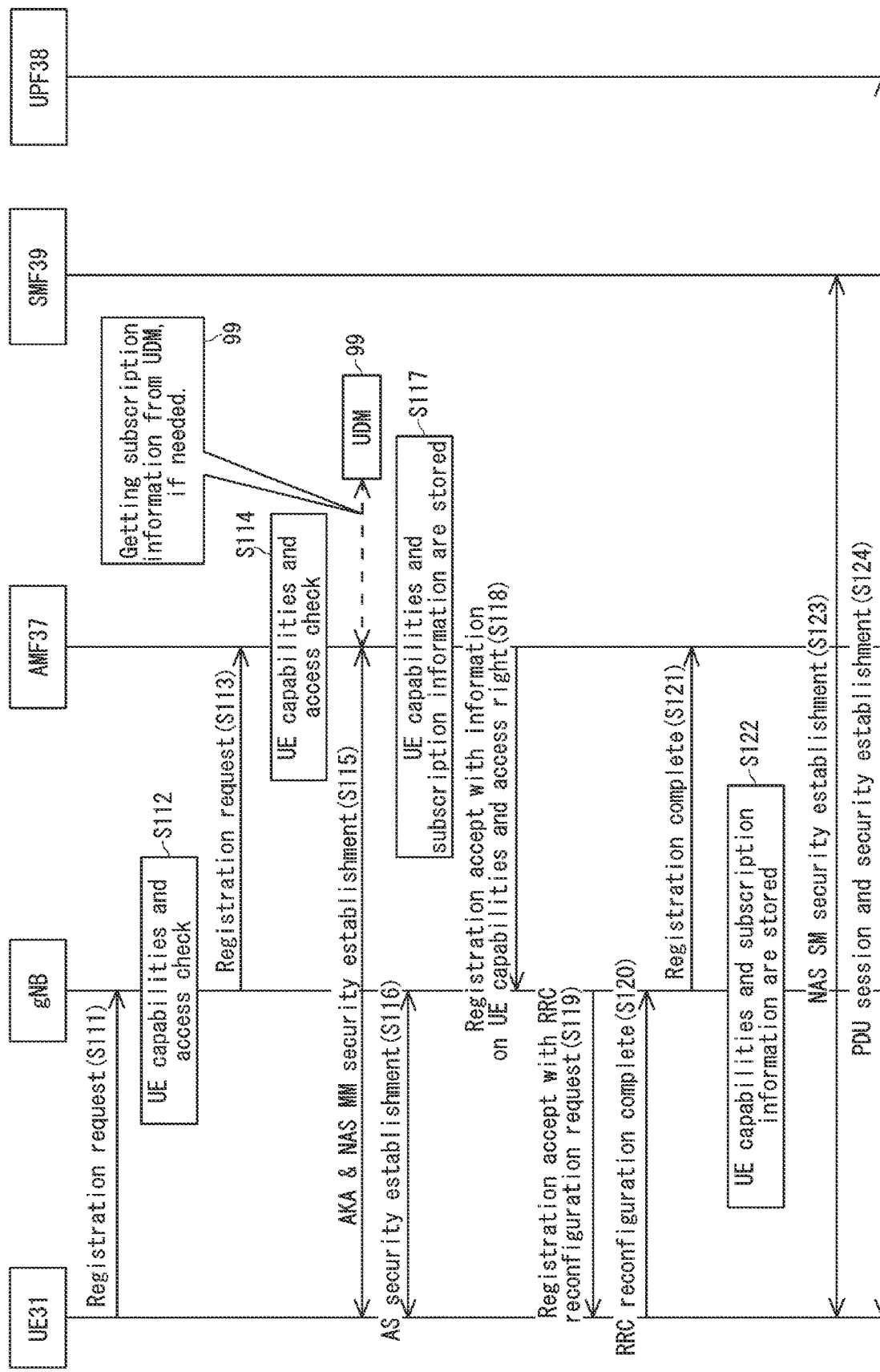
FIG. 9 is a diagram illustrating a processing flow of register processing of UE according to the second example embodiment.

Next, using FIG. 9, a flow of register processing that the UE 31 performs to the 5GS will be described. It is assumed that the UE 31 has already performed the attach processing to the EPS.

First, the UE 31 sends a registration request message to the gNB (S111). The registration request message includes the UE's capability on radio access and security. Next, the gNB checks whether or not the UE's capability and access rights are valid as information used for determining whether the gNB accepts the registration request message (S112). Next, when the gNB checks that the UE's capability and access rights are valid, the gNB sends a registration request message to the AMF 37 (S113).

Next, the AMF 37 checks whether or not the UE's capability and the access rights are valid as information used for determining whether the AMF 37 accepts the registration request message (S114). Next, between the UE 31 and the AMF 37, the AKA is performed and NAS MM security is established (NAS MM security establishment) (S115). In this step, when the AMF 37 does not have necessary information to perform the AKA, the AMF 37 acquires the necessary information from the HSS+UDM 41.

Next, between the UE 31 and the gNB, AS security is established (AS security establishment) (S116). Next, the AMF 37 stores information on the UE's capability on radio access, information on security, and information on access rights (S117). The information on security (security capability) is added to the AMF 37, based on security policy in the network or service requirements.

Next, the AMF 37 sends a registration accept message to the gNB (S118). The registration accept message includes information on the UE's capability and the access rights that the AMF 37 has. Next, the gNB sends a registration accept message to the the UE 31 (S119). The registration accept message includes an RRC reconfiguration request message.

Next, the UE 31 sends an RRC reconfiguration complete message to the gNB (S120). Next, the gNB sends a registration complete message to the the AMF 37 (S121). Next, the gNB stores information on the UE's capability and the access rights received from the AMF 37 (S122).

Next, between the UE 31 and the SMF+PGW-C 39, NAS SM security is established (NAS SM security establishment) (S123). Next, between the UE 31 and the UPF+PGW-U 38, a PDU session is established. Further, security enabling integrity protection and encryption to be performed may be established between the UE 31 and the UPF+PGW-U 38. Security enabling integrity protection and encryption to be performed may be established between the UE 31 and the gNB.

As described thus far, the UE 31 and the UE 35, when moving between the 5GS and the EPS while in the idle mode or the communication mode, can perform communication, using the communication system at the movement destination.

Figure 10:
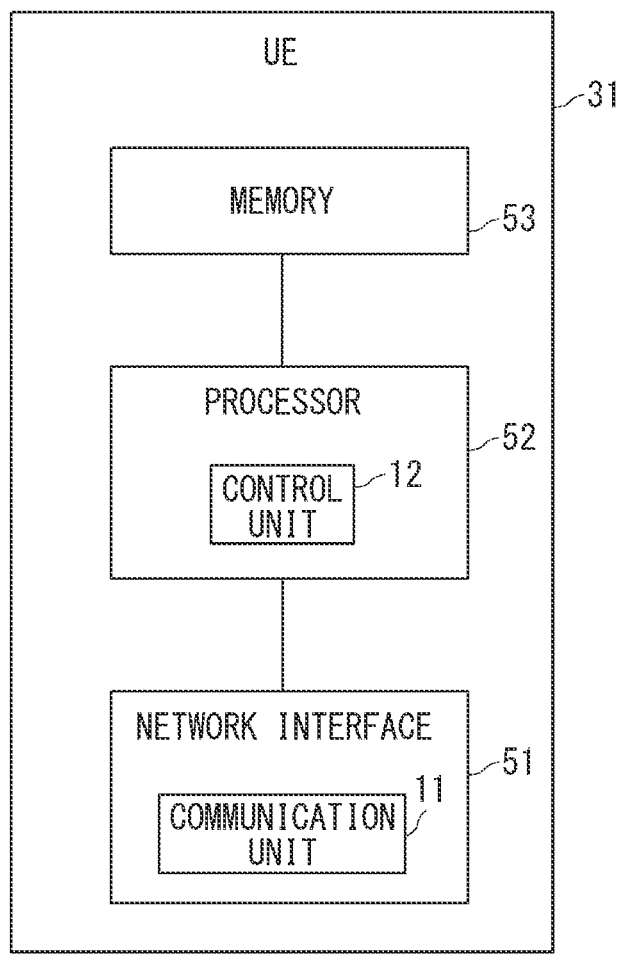
FIG. 10 is a block diagram of UE according to the second example embodiment.

Next, using FIG. 10, a configuration example of the UE 31 will be described. Since the UE 35 has a similar configuration to that of the UE 31, a detailed description of a configuration of the UE 35 will be omitted. The UE 31 includes a network interface 51, a processor 52, and a memory 53.

The network interface 51 may include, for example, an antenna used for performing radio communication. Further, the network interface 51 may include a baseband processor that performs digital baseband signal processing. Alternatively, the network interface 51 may include a network interface card (NIC) conforming to the IEEE 802.3 series or IEEE 802.11. The network interface 51 is used to perform functions or processing in the communication unit 11 in FIG. 1. Further, the network interface 51 sends or receives the messages described in FIGS. 5 to 9.

The processor 52 is used to perform functions or processing in the control unit 12 in FIG. 1. Further, the processor 52 reads software (computer programs) from the memory 53 and performs the processing described in FIGS. 5 to 9. Still further, the processor 52 performs the processing relating to generation of security keys that was described in FIGS. 3 and 4. The processor 52 may be, for example, a microprocessor, a micro processing unit (MPU), or a central processing unit (CPU). The processor 52 may include multiple processors.

The memory 53 is constituted by a combination of a volatile memory and a nonvolatile memory. The memory 53 may include a storage that is arranged apart from the processor 52. In this case, the processor 52 may access the memory 53 via a not-illustrated I/O interface.

The memory 53 is used for storing software or a software module group. The processor 52 reads and executes the software or the software module group from the memory 53. The memory 53 may, for example, store security keys generated in the processor 52.

Figure 11:
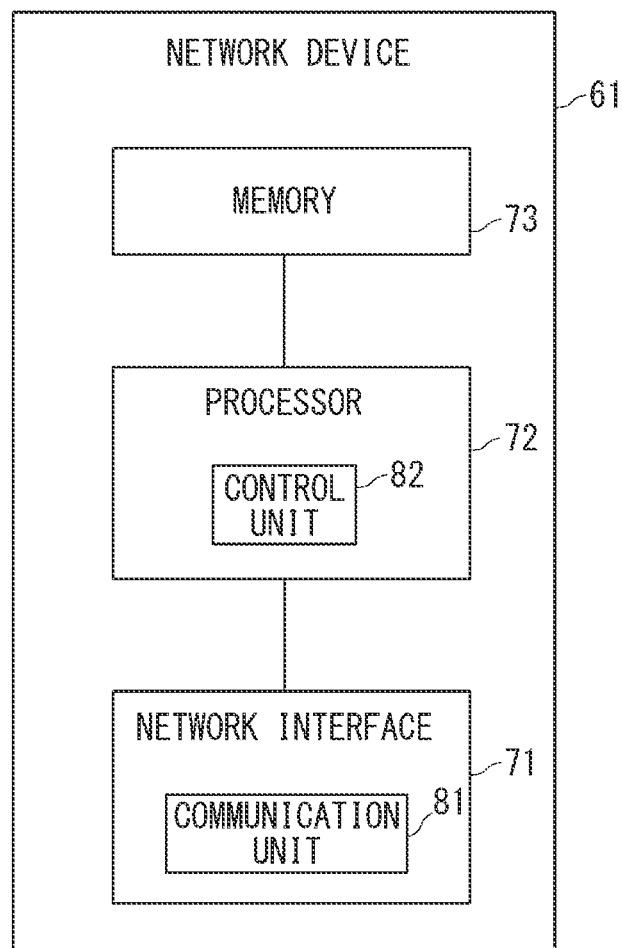
FIG. 11 is a block diagram of a network device according to the second example embodiment.

Next, using FIG. 11, a configuration example of a network device 61 will be described. Examples of the network device 61 include the eNB, the gNB, the MME 33, the SGW 34, the AMF 37, the UPF+PGW-U 38, the SMF+PGW-C 39, the PCF+PCRF 40, and the HSS+UDM 41.

The network device 61 includes a network interface 71, a processor 72, and a memory 73. The network interface 71 includes a communication unit 81, and the processor 72 includes a control unit 82.

The network interface 71 communicates with, for example, another network device, the UE 31, or the UE 35. Further, the network interface 71 may include a baseband processor that performs digital baseband signal processing. The network interface 71 sends or receives the messages described in FIGS. 5 to 9.

The processor 72 reads software (computer programs) from the memory 73 and performs the processing described in FIGS. 5 to 9. Further, the processor 72 performs the processing relating to generation of security keys that was described in FIGS. 3 and 4. The processor 72 may be, for example, a microprocessor, a micro processing unit (MPU), or a central processing unit (CPU). The processor 72 may include multiple processors.

The memory 73 is constituted by a combination of a volatile memory and a nonvolatile memory. The memory 73 may include a storage that is arranged apart from the processor 72. In this case, the processor 72 may access the memory 73 via a not-illustrated I/O interface.

The memory 73 is used for storing software or a software module group. The processor 72 reads and executes the software or the software module group from the memory 73. The memory 73 may, for example, store security keys generated in the processor 72.

In the above-described examples, programs are stored using various types of non-transitory computer readable medium and can be supplied to a computer. The non-transitory computer readable media include various types of tangible storage media. Examples of the non-transitory computer readable medium include a magnetic recording medium (for example, a flexible disk, a magnetic tape, and a hard disk drive) and a magneto-optical recording medium (for example, a magneto-optical disk). Further, examples of the non-transitory computer readable medium include a CD-read only memory (ROM), a CD-R, and a CD-R/W. Still further, examples of the non-transitory computer readable medium include a semiconductor memory. The semiconductor memories include, for example, a mask ROM, a programmable ROM (PROM), an erasable PROM (EPROM), a flash ROM, and a random access memory (RAM). In addition, programs may be supplied to a computer by various types of transitory computer readable media. Examples of the transitory computer readable medium include an electrical signal, an optical signal, and electromagnetic waves. The transitory computer readable medium is capable of supplying programs to a computer via a wired communication path, such as an electric wire and an optical fiber, or a wireless communication path.

Note that the present disclosure is not limited to the above-described example embodiments and can be modified appropriately without departing from the spirit and scope of the present disclosure. In addition, the present disclosure may be embodied by appropriately combining respective example embodiments.

The present invention was described above through example embodiments thereof, but the present invention is not limited to the above example embodiments. Various modifications that could be understood by a person skilled in the art may be applied to the configurations and details of the present invention within the scope of the present invention.

The whole or part of the example embodiments disclosed above can be described as, but not limited to, the following supplementary notes.

(Supplementary note 1) A communication terminal including:
  a control unit configured to, in a case of a movement from a communication area formed by a 5 generation system (5GS) to a communication area formed by an evolved packet system (EPS) or a movement from a communication area formed by the EPS to a communication area formed by the 5GS, determine whether or not a communication system forming a communication area at a movement destination can satisfy requirements of services; and
  a communication unit configured to, when it is determined that the communication system forming the communication area at the movement destination can satisfy the requirements of the services, send a connection request message to the communication system forming the communication area at the movement destination.

(Supplementary note 2) The communication terminal according to supplementary note 1, wherein
  the control unit determines whether or not the communication system forming the communication area at the movement destination can satisfy the requirements of the services and determines whether or not the communication area at the movement destination is a communication area where access is allowed, and
  when it is determined that the communication system forming the communication area at the movement destination can satisfy the requirements of the services and it is further determined that the communication area at the movement destination is a communication area where access is allowed, the communication unit sends a connection request message to the communication system forming the communication area at the movement destination.

(Supplementary note 3) The communication terminal according to supplementary note 2, wherein
  the control unit determines whether or not the communication terminal has a security key to be used in the communication area at the movement destination, and
  when it is determined that the communication system forming the communication area at the movement destination can satisfy the requirements of the services, it is determined that the communication area at the movement destination is a communication area where access is allowed, and it is further determined that the communication terminal has a security key to be used in the communication area at the movement destination, the communication unit sends a connection request message to the communication system forming the communication area at the movement destination.

(Supplementary note 4) The communication terminal according to supplementary note 3, wherein the control unit, using the security key, derives an integrity key used for protection of integrity or updates the integrity key.

(Supplementary note 5) The communication terminal according to supplementary note 4, wherein the connection request message includes an identifier of the integrity key.

(Supplementary note 6) The communication terminal according to any one of supplementary notes 1 to 5, wherein the connection request message includes information on a network slice.

(Supplementary note 7) A network device including:
  a control unit configured to, when a communication terminal has moved from a communication area formed by a 5 generation system (5GS) to a communication area formed by an evolved packet system (EPS) or the communication terminal has moved from a communication area formed by the EPS to a communication area formed by the 5GS, determine whether or not a communication system forming a communication area at a movement destination of the communication terminal can satisfy requirements of services; and
  a communication unit configured to, when it is determined that the communication system forming the communication area at the movement destination of the communication terminal can satisfy the requirements of the services, send a relocation request message to the communication system forming the communication area at the movement destination.

(Supplementary note 8) The network device according to supplementary note 7, wherein
  the control unit determines whether or not the communication system forming the communication area at the movement destination of the communication terminal can satisfy the requirements of the services and determines whether or not access is allowed for the communication terminal in the communication area at the movement destination, and
  when it is determined that the communication system forming the communication area at the movement destination of the communication terminal can satisfy the requirements of the services and it is further determined that access is allowed for the communication terminal in the communication area at the movement destination, the communication unit sends a relocation request message to the communication system forming the communication area at the movement destination.

(Supplementary note 9) A communication system including:
  a first network device configured to, when a communication terminal moves from a communication area formed by a 5 generation system (5GS) to a communication area formed by an evolved packet system (EPS) or the communication terminal moves from a communication area formed by the EPS to a communication area formed by the 5GS, determine whether or not, in a communication system forming a communication area before the movement of the communication terminal, access rights and security capability of the communication terminal are valid; and a second network device configured to, in a communication system forming a communication area after the movement of the communication terminal, receive a message on relocation of the communication terminal from the first network device.

(Supplementary note 10) The communication system according to supplementary note 9, wherein the second network device, using a security key received from the first network device, derives a security key to be used in a communication area after the movement of the communication terminal.

(Supplementary note 11) The communication system according to supplementary note 10, wherein the second network device, using the derived security key, derives an integrity key used for protection of integrity and a cipher key used for encryption of a message.

(Supplementary note 12) The communication system according to any one of supplementary notes 9 to 11, wherein the first network device determines whether or not a communication system forming a communication area at a movement destination of the communication terminal can satisfy requirements of services.

(Supplementary note 13) A communication method including:
  in a case of a movement from a communication area formed by a generation system (5GS) to a communication area formed by an evolved packet system (EPS) or a movement from a communication area formed by the EPS to a communication area formed by the 5GS, determining whether or not a communication system forming a communication area at a movement destination can satisfy requirements of services; and
  when it is determined that the communication system forming the communication area at the movement destination can satisfy the requirements of the services, sending a connection request message to the communication system forming the communication area at the movement destination.

(Supplementary note 14) A communication method including:
  when a communication terminal has moved from a communication area formed by a 5 generation system (5GS) to a communication area formed by an evolved packet system (EPS) or the communication terminal has moved from a communication area formed by the EPS to a communication area formed by the 5GS, determining whether or not a communication system forming a communication area at a movement destination of the communication terminal can satisfy requirements of services; and
  when it is determined that the communication system forming the communication area at the movement destination of the communication terminal can satisfy the requirements of the services, sending a relocation request message to the communication system forming the communication area at the movement destination.

(Supplementary note 15) A non-transitory computer readable medium storing a program causing a computer to perform a method including:
  in a case of a movement from a communication area formed by a 5 generation system (5GS) to a communication area formed by an evolved packet system (EPS) or a movement from a communication area formed by the EPS to a communication area formed by the 5GS, determining whether or not a communication system forming a communication area at a movement destination can satisfy requirements of services; and
  when it is determined that the communication system forming the communication area at the movement destination can satisfy the requirements of the services, sending a connection request message to the communication system forming the communication area at the movement destination.

(Supplementary note 16) A non-transitory computer readable medium storing a program causing a computer to perform a method including:
  when a communication terminal has moved from a communication area formed by a 5 generation system (5GS) to a communication area formed by an evolved packet system (EPS) or the communication terminal has moved from a communication area formed by the EPS to a communication area formed by the 5GS, determining whether or not a communication system forming a communication area at a movement destination of the communication terminal can satisfy requirements of services; and
  when it is determined that the communication system forming the communication area at the movement destination of the communication terminal can satisfy the requirements of the services, sending a relocation request message to the communication system forming the communication area at the movement destination.

REFERENCE SIGNS LIST

10 COMMUNICATION TERMINAL
11 COMMUNICATION UNIT
12 CONTROL UNIT
31 UE
32 E-UTRAN
33 MME
34 SGW
35 UE
36 5G RAN
37 AMF
38 UPF+PGW-U
39 SMF+PGW-C
40 PCF+PCRF
41 HSS+UDM
51 NETWORK INTERFACE
52 PROCESSOR
53 MEMORY
61 NETWORK DEVICE
71 NETWORK INTERFACE
72 PROCESSOR
73 MEMORY
81 COMMUNICATION UNIT
82 CONTROL UNIT

The invention claimed is:
1. A communication terminal comprising:
at least one processor comprising hardware; and
at least one memory operatively coupled with the at least one processor, wherein the at least one processor is configured to:

obtain a security context of the communication terminal, and derive, using information included in the security context of the communication terminal, at least one security key to be used in a second communication network having a second network device operating as an access and mobility management function (AMF) during a handover procedure to handover the communication terminal from a first communication network having a first network device operating as a mobility management entity (MME) to the second communication network, wherein the security context is obtained after the first network device checks access rights and security capabilities of the communication terminal during the handover procedure, and wherein the first communication network comprises an evolved packet system (EPS) network and the second communication network comprises a 5th generation system (5GS) network.

2. The communication terminal according to claim 1, wherein the at least one security key is a Non-Access Stratum (NAS) key for integrity protection or a NAS key for encryption of a NAS message transmitted between the second network device and the communication terminal.

3. A method performed by a communication terminal comprising:

obtaining a security context of the communication terminal, and deriving, using information included in the security context of the communication terminal, at least one security key to be used in a second communication network having a second network device operating as an access and mobility management function (AMF) during a handover procedure to handover the communication terminal from a first communication network having a first network device operating as a mobility management entity (MME) to the second communication network, wherein the security context is obtained after the first network device checks access rights and security capabilities of the communication terminal during the handover procedure, and wherein the first communication network comprises an evolved packet system (EPS) network and the second communication network comprises a 5th generation system (5GS) network.

4. The method according to claim 3, wherein the at least one security key is a Non-Access Stratum (NAS) key for integrity protection or a NAS key for encryption of a NAS message transmitted between the second network device and the communication terminal.

* * * * *